United States Patent
Lee et al.

(10) Patent No.: US 12,533,629 B2
(45) Date of Patent: Jan. 27, 2026

(54) GAS SEPARATION MEMBRANE OPERATION METHOD

(71) Applicant: LOTTE CHEMICAL CORPORATION, Seoul (KR)

(72) Inventors: Sang Jung Lee, Daejeon (KR); Sang A Nam, Daejeon (KR); Myung Wook Kim, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 347 days.

(21) Appl. No.: 18/254,645

(22) PCT Filed: Nov. 30, 2021

(86) PCT No.: PCT/KR2021/017846
§ 371 (c)(1),
(2) Date: May 26, 2023

(87) PCT Pub. No.: WO2022/114914
PCT Pub. Date: Jun. 2, 2022

(65) Prior Publication Data
US 2024/0001292 A1    Jan. 4, 2024

(30) Foreign Application Priority Data
Nov. 30, 2020   (KR) ........................ 10-2020-0165170

(51) Int. Cl.
*B01D 53/22*   (2006.01)

(52) U.S. Cl.
CPC ........ *B01D 53/22* (2013.01); *B01D 2053/223* (2013.01)

(58) Field of Classification Search
CPC .......................... B01D 53/22; B01D 2053/223
See application file for complete search history.

(56) References Cited

U.S. PATENT DOCUMENTS

| | | |
|---|---|---|
| 5,030,251 A | 7/1991 | Rice et al. |
| 5,169,412 A | 12/1992 | Prasad et al. |

(Continued)

FOREIGN PATENT DOCUMENTS

| | | |
|---|---|---|
| JP | S6242723 A | 2/1987 |
| JP | H07136472 A | 5/1995 |

(Continued)

OTHER PUBLICATIONS

International Search Report issued in Application No. PCT/KR2021/017846, mailed on Mar. 14, 2022 (5 pages).

(Continued)

*Primary Examiner* — Anthony Shumate
(74) *Attorney, Agent, or Firm* — Osha Bergman Watanabe & Burton LLP

(57) ABSTRACT

The present invention relates to a gas separation membrane operation method. The method may include (a) introducing an external gas into a separation membrane module through an inlet line, (b) separating, by the separation membrane module, the external gas into a permeable gas and an impermeable gas according to permeability with respect to a separation membrane, transferring the permeable gas to the separation line, and transferring the impermeable gas to the outflow line, and (c) injecting at least a part of the impermeable gas transferred to the outflow line into an inlet of the separation membrane module.

4 Claims, 2 Drawing Sheets

(56) References Cited

U.S. PATENT DOCUMENTS

| | | | |
|---|---|---|---|
| 2007/0180989 A1* | 8/2007 | Tanihara | B01D 63/107 95/54 |
| 2010/0326278 A1* | 12/2010 | Nakamura | B01D 63/0241 96/8 |
| 2012/0304856 A1* | 12/2012 | Kanetsuki | B01D 53/228 95/47 |
| 2017/0001148 A1* | 1/2017 | Kulkarni | B01D 63/02 |
| 2017/0333833 A1* | 11/2017 | Ota | B01D 71/404 |
| 2019/0046922 A1 | 2/2019 | Jensvold et al. | |
| 2025/0050269 A1* | 2/2025 | Amo | B01D 69/148 |

FOREIGN PATENT DOCUMENTS

| | | |
|---|---|---|
| JP | H0852316 A | 2/1996 |
| JP | 2003010648 A | 1/2003 |
| JP | 2013534863 A | 9/2013 |
| JP | 2018183756 A | 11/2018 |
| KR | 10-2011-0117465 A | 10/2011 |
| KR | 10-2015-0000619 A | 1/2015 |
| KR | 10-2015-0005008 A | 1/2015 |
| KR | 101911786 B1 | 1/2019 |
| WO | 2004/054688 A1 | 7/2004 |
| WO | 2004/067133 A2 | 8/2004 |
| WO | 2013-092606 A1 | 6/2013 |
| WO | 2017/146589 A1 | 8/2017 |
| WO | 2020/073036 A1 | 4/2020 |

OTHER PUBLICATIONS

Written Opinion issued in Application No. PCT/KR2021/017846, mailed on Mar. 14, 2022 (4 pages).
Extended European Search Report issued in corresponding European Application No. 21898739.4, dated Oct. 4, 2024 (9 pages).
Office Action issued in corresponding Japanese Patent Application No. 2023532533, dated Jun. 4, 2024, with translation (7 pages).
Office Action issued in corresponding Chinese Patent Application No. 202180090676.2, dated Jun. 25, 2025, with translation (13 pages).

* cited by examiner

[FIG. 1]
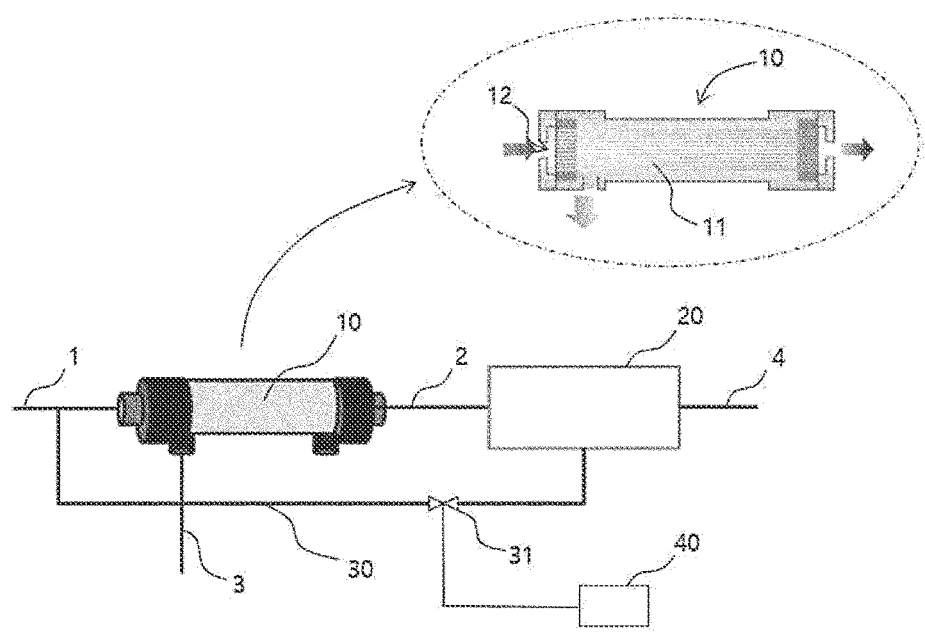

[FIG. 2]
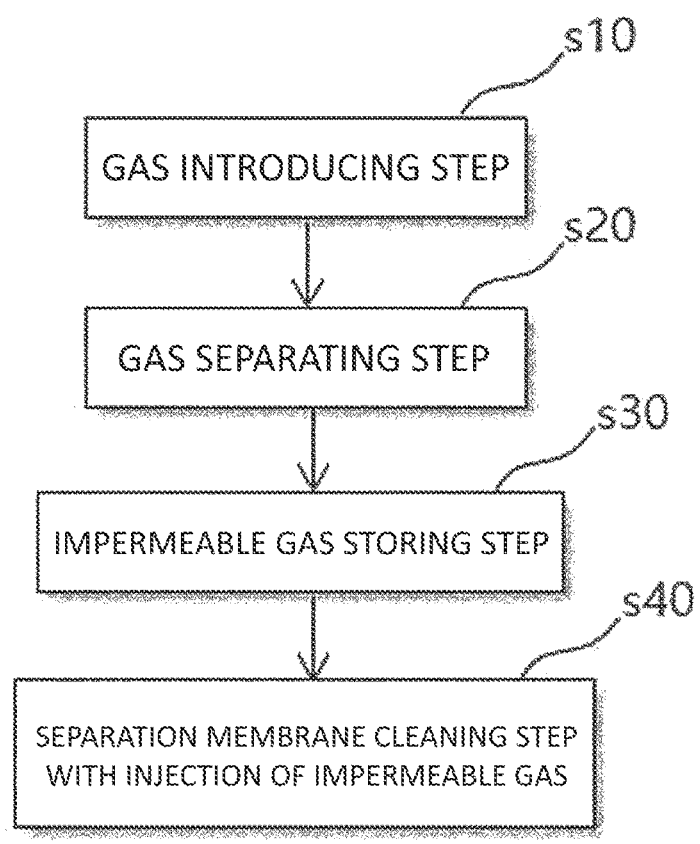

GAS SEPARATION MEMBRANE OPERATION METHOD

TECHNICAL FIELD

The present invention relates to a gas separation membrane operation method that cleans a gas separation membrane by using a gas separated by the gas separation membrane.

BACKGROUND ART

Gas separation membranes are used to separate various gases, and recently, the use of gas separation membranes has increased. The technology related to the gas separation membrane in the related art focuses on a technology for manufacturing separation membranes and a technology for designing processes. However, technological developments to cope with contamination of the separation membrane, which directly causes deteriorations in separation membrane performance and lifespan, are insufficient.

In the related art, in most cases, to reduce contamination of the separation membrane, efficiency in pre-processing an exhaust gas is increased before the exhaust gas is supplied to the separation membrane, and a contaminated separation membrane is replaced. However, in this case, there is a problem in that the contamination of or damage to the expensive separation membrane degrades separation efficiency, and the replacement of the separation membrane increases costs.

To solve the problem, studies are being conducted to improve separation efficiency by removing contamination of the separation membrane by using external cleaning gases, water, chemical agents, and the like. However, the use of external cleaning gases or chemical agents causes problems of increases in operation costs, environmental pollution, and a need for secondary treatment.

Patent Document 1 (Korean Patent No. 10-1911786) discloses a method of separately introducing a gas, which is used to clean a separation membrane, from the outside. However, in this case, there is a problem in that cleaning costs are increased. In addition, because it is necessary to introduce the cleaning gas separately from the outside, there are problems in that a gas separated by a gas membrane needs to be discharged to the outside without being reused, and a separate configuration for introducing the cleaning gas from the outside is required.

Patent Document 2 (Japanese Patent Laid-Open No. 1995-136472) discloses a method of cleaning a separation membrane by injecting water, and backwashing the separation membrane by injecting air. However, in this case, there is a problem in that a separate configuration for injecting water is required, and costs are increased because of the production of wastewater that needs to be treated.

DISCLOSURE

Technical Problem

An object of the present invention is to provide a gas separation membrane operation method capable of cleaning a gas separation membrane by reusing a gas that is to be discarded among gases separated by the gas separation membrane.

Technical Solution

The present invention provided to achieve the above-mentioned object, relates to a gas separation membrane cleaning method. The method may include (a) introducing an external gas into a separation membrane module through an inlet line, (b) separating, by the separation membrane module, the external gas into a permeable gas and an impermeable gas according to permeability with respect to a separation membrane, transferring the permeable gas to the separation line, and transferring the impermeable gas to the outflow line, and (c) injecting at least a part of the impermeable gas transferred to the outflow line into an inlet of the separation membrane module.

According to the embodiment of the present invention, in step (c), the impermeable gas may be stored in a cleaning tank connected to the outflow line, and the impermeable gas stored in the cleaning tank may be injected into the inlet of the separation membrane module.

According to the embodiment of the present invention, in step (c), the impermeable gas may be injected into the inlet of the separation membrane module through a cleaning line having one side connected to the cleaning tank, and the other side connected to a lateral portion of the inlet line.

According to the embodiment of the present invention, in step (c), the impermeable gas may be circulated and injected multiple times without introducing the external gas.

Advantageous Effects

According to the present invention, it is possible to prevent the source of contamination from being accumulated in the separation membrane and improve separation efficiency by discharging the contaminants from the separation membrane. Because the gas discharged from the separation membrane is used, it is possible to ensure stability, improve the gas separation membrane performance and lifespan, and reduce operation costs and membrane replacement costs.

DESCRIPTION OF DRAWINGS

FIG. 1 is a cross-sectional side view schematically illustrating a gas separation membrane cleaning device used to perform a gas separation membrane operation method according to the present invention.

FIG. 2 is a flowchart schematically illustrating a gas separation membrane cleaning method according to the present invention.

MODES OF THE INVENTION

Hereinafter, specific contents for carrying out the present invention will be described with reference to the accompanying drawings. Further, in the description of the present invention, the specific descriptions of publicly known related functions will be omitted when it is determined that the specific descriptions may unnecessarily obscure the subject matter of the present invention.

FIG. 1 is a cross-sectional side view schematically illustrating a gas separation membrane cleaning device used to perform a gas separation membrane operation method according to the present invention. FIG. 2 is a flowchart schematically illustrating a gas separation membrane cleaning method according to the present invention.

With reference to FIGS. 1 and 2, a gas separation membrane cleaning device used to perform a gas separation membrane operation method according to the present invention includes a separation membrane module 10, a cleaning tank 20, a cleaning line 30, and a controller 40. Hereinafter, the respective steps of the gas separation membrane operation method, which are performed by the gas separation membrane cleaning device, will be described with reference to the description of the respective components of the gas separation membrane cleaning device. The gas separation membrane operation method includes a separating process and a cleaning process.

The respective steps of the separating process of the gas separation membrane operation method will be described below.

An inlet line 1 is connected to one side of the separation membrane module 10, and an outflow line 2 is connected to the other side of the separation membrane module 10. A separation line 3 is connected to a lateral surface of the separation membrane module 10. The inlet line 1, the outflow line 2, and the separation line 3 are each provided in the form of a pipe. The separation membrane module 10 is provided in the form of an extending pipe and has a plurality of separation membranes 11 provided as a bundle of separation membranes. For example, the separation membrane 11 may be a $CO_2$ trapping separation membrane that separates $CO_2$ from $N_2$.

One side of the inlet line 1 is connected to a gas injector (not illustrated) for injecting an external gas at high pressure, and the other side of the inlet line 1 is connected to the separation membrane module 10. The controller 40 controls a pump (not illustrated) or the like and introduces an external gas into the separation membrane module 10 through the inlet line 1 from the gas injector (s10). The external gas is a separation target gas to be separated by the gas separation membrane during the separating process and distinguished from a gas used to clean the separation membrane during the cleaning process to be described below.

Next, the separation membrane module 10 separates the external gas into a permeable gas and an impermeable gas depending on permeability with respect to the separation membrane 11. The permeable gas is transferred to the separation line 3, and the impermeable gas is transferred to the outflow line 2 (s20). The permeable gas is a gas that has higher permeability with respect to the separation membrane 11 of the separation membrane module 10 and passes through the separation membrane 11. The impermeable gas is a gas having relatively lower permeability with respect to the separation membrane 11 than the permeable gas.

The plurality of separation membranes 11 of the separation membrane module 10 is arranged in a horizontal direction in the drawing. The separation membrane module 10 is configured such that the permeable gas having passed through the separation membrane 11 is discharged in a direction perpendicular to the direction in which the separation membranes 11 are arranged, and the impermeable gas, which cannot pass through the separation membrane 11, is discharged in a direction identical to the direction in which the separation membranes 11 are arranged.

One side of each of the separation membranes 11 of the separation membrane module 10 communicates with the inlet line 1, and the other side of each of the separation membranes 11 communicates with the outflow line 2. An external space of the separation membrane 11 communicates with the separation line 3.

The permeable gas, among the gases injected into the inlet line 1, passes through the separation membrane 11 in a radial direction and passes through the external space of the separation membrane 11. The permeable gas is separated and flows into the separation line 3 that communicates with the external space of the separation membrane 11.

The impermeable gas, among the external gases injected into the inlet line 1, is introduced into the separation membrane 11, moved in a longitudinal direction of the separation membrane 11, and transferred to the outflow line 2 that communicates with the other side of the separation membrane 11.

The contamination of and damage to the separation membrane 11 is caused by main factors, such as dust, moisture, NOx, SOx, and the like. The sources of contamination, which remains in small amount after the introduced gases are pre-processed, are accumulated in the separation membrane module 10. These substances react with moisture over time and cause the contamination of and damage to the membrane, which adversely affects separation efficiency of the separation membrane module 10. In addition, because NOx and Sox react with moisture and create acid, it is necessary to minimize the accumulation of moisture, NOx, and SOx in the separation membrane.

The respective steps of the cleaning process of the gas separation membrane operation method will be described below.

After the separating process of introducing the external gas into the separation membrane module 10 and separating the gases is performed, the cleaning process of injecting at least a part of the impermeable gas, which is transferred to the outflow line 2, into an inlet 12 of the separation membrane module 10 is performed separately from the separating process (s30).

The cleaning tank 20 is connected to the outflow line 2, and at least a part of the impermeable gas is stored in the cleaning tank 20. The cleaning tank 20 is provided at a rear end of the gas separation membrane cleaning device. The cleaning tank 20 stores a predetermined amount of impermeable gas that is separated from the separation membrane module 10 and discarded. The impermeable gas, which remains after the introduced gases are separated, is mainly N2, O2, CO2, CO, and the like. The impermeable gas is configured as a gas having lower permeability than the permeable gas.

The impermeable gas, which is not stored in the cleaning tank 20, is discharged to the outside through a discharge line 4. The cleaning tank 20 does not store the gas, which is supplied from the outside, except for the impermeable gas. As described below, when the separation membrane module 10 is contaminated, the cleaning tank 20 uses the impermeable gas stored in the cleaning tank 20 to clean the separation membrane module 10. This configuration will be described in detail below.

One side of the cleaning line 30 is connected to the inlet 12 of the separation membrane module 10, and the other side of the cleaning line 30 is connected to the cleaning tank 20. The cleaning line 30 is provided in the form of a pipe. The impermeable gas stored in the cleaning tank 20 is supplied, at a pressure higher than a production pressure, to the cleaning line 30 from the cleaning tank 20. The cleaning line 30 defines a route through which the impermeable gas, which is supplied from the cleaning tank 20, is injected into the inlet 12 of the separation membrane module 10 through a valve 31. The controller 40 injects the impermeable gas, which is supplied to the cleaning line 30 from the cleaning tank 20, into the inlet 12 of the separation membrane module 10 through the valve 31.

Because one side of the cleaning line 30 may communicate with the inlet line 1 and connect the inlet line 1 to the inlet 12 of the separation membrane module 10, the cleaning line 30 may communicate with an internal space of the separation membrane module 10 through the existing inlet line 1 without separately connecting the cleaning line 30 to the separation membrane module 10. However, the cleaning line 30 may be connected to the inlet 12 of the separation membrane module 10 independently of the inlet line 1.

Meanwhile, the external gas, which is injected into the separation membrane module 10 during the separating process, is not introduced during the cleaning process according to the present invention, and the impermeable gas, which has already been used and stored in the cleaning tank 20, is circulated and injected into the inlet 12 of the separation membrane module 10 multiple times. The controller 40 may control the valve 31. The controller 40 may control the valve 31 so that the impermeable gas is circulated and injected into the inlet 12 of the separation membrane 11 in a predetermined cycle. Therefore, the impermeable gas, which is generated during the production process, is consistently supplied to the inlet 12 of the separation membrane 11, the source of contamination may be managed so as not to be accumulated in the separation membrane module 10.

The impermeable gas may be injected into each of the separation membranes 11 of the separation membrane module 10 through the inlet 12 of the separation membrane module and detach and discharge the source of contamination in the separation membrane module 10.

Therefore, it is possible to improve efficiency and lifespan of the separation membrane module 10. In addition, because a separate chemical agent is not used, it is possible to minimize negative influence on the separation membrane 11. Because the impermeable gas is a gas generated during the production process, the impermeable gas may be smoothly circulated and supplied to clean the separation membrane module 10. For example, in case that the separation membrane 11 according to the present invention is the $CO_2$ trapping separation membrane, the impermeable gas is mainly provided as $N_2$. Because $N_2$ is stable in the separation membrane 11, it is possible to cope with the contamination of the separation membrane module 10 without separate chemical stimulus.

According to the embodiments of the present invention, it is possible to minimize contamination and damage that occur when the gas separation membrane is used to separate the gases. Further, it is possible to prolong the lifespan of the separation membrane. Unlike the method in the related art that generally uses external gas or water, the present invention may reduce operation costs by using the gas that is discarded among the separated gases. That is, according to the present invention, it is possible to recover and maintain the separation efficiency of the gas separation membrane that separates the gases. Further, it is possible to prevent contamination of the separation membrane module by using the discarded gas.

The protective scope in this field is not limited to the description and expression of the embodiments explicitly described above. In addition, it is reiterated that the scope of protection of the present invention should not be limited by the substitutions or modifications which are obvious in the art.

DESCRIPTION OF REFERENCE NUMERALS

1: Inlet line
2: Outflow line
3: Separation line
4: Discharge line
10: Separation membrane module
11: Separation membrane
12: Inlet of separation membrane module
20: Cleaning tank
30: Cleaning line
31: Valve
40: Controller

The invention claimed is:

1. A gas separation membrane operation method comprising:
   (a) introducing an external gas into a separation membrane module through an inlet line connected to an inlet of the separation membrane module;
   (b) separating, by the separation membrane module, the external gas into a permeable gas and an impermeable gas according to permeability with respect to a separation membrane, transferring the permeable gas to a separation line connected to a lateral surface of the separation membrane module, and transferring the impermeable gas to an outflow line connected to a side of the separation membrane module opposite the inlet;
   (c) storing at least a part of the impermeable gas transferred to the outflow line in a cleaning tank connected to the outflow line; and
   (d) cleaning the separation membrane module by injecting the impermeable gas stored in the cleaning tank into the inlet of the separation membrane module through a cleaning line, wherein the cleaning line has one side connected to the cleaning tank and the other side connected to a lateral portion of the inlet line.

2. The gas separation membrane operation method of claim 1, wherein in step (d), the impermeable gas is circulated and injected multiple times in a predetermined cycle without introducing the external gas.

3. The gas separation membrane operation method of claim 1, wherein, in step (d), a controller is configured to control a valve provided in the cleaning line such that the impermeable gas stored in the cleaning tank is injected into the inlet of the separation membrane module through the valve, and the impermeable gas is injected into a plurality of separation membranes of the separation membrane module to detach and discharge contaminants from the separation membrane module.

4. The gas separation membrane operation method of claim 1, wherein a discharge line configured to vent the impermeable gas to an outside, and the cleaning line configured to inject the impermeable gas stored in the cleaning tank into the inlet of the separation membrane module, are connected to the cleaning tank as branches.

* * * * *